Jan. 27, 1970  C. B. GROSCH ET AL  3,491,591
DYNAMIC SPACE NAVIGATION AND SURVEYING SYSTEM
Filed April 3, 1967  8 Sheets-Sheet 1

Fig. 1

INVENTORS
CHARLES B. GROSCH
ROBERT L. LILLESTRAND
BY
Cushman, Darby & Cushman
ATTORNEYS

C. B. GROSCH ET AL 3,491,591

DYNAMIC SPACE NAVIGATION AND SURVEYING SYSTEM

Filed April 3, 1967

INVENTORS
CHARLES B. GROSCH
ROBERT L. LILLESTRAND
BY

Cushman, Darby & Cushman
ATTORNEYS

Accuracy of Navigation Technique for Various Numbers of Test Probe Sightings

Fig. 5

Effect of Probe Release Errors
(Speed and Direction)

Dependence of Navigational Accuracy of Direction of Probe Release (Based on 12 Sightings over One Orbit)

Effect of Introducing Various Components of Ejection Velocity as Unknowns

VARIATION OF NAVIGATIONAL ERROR ($\Sigma$) WITH EJECTION DIRECTION FOR $\tau_n = 1/4$ (ALL VALUES IN km)

APPLICATION OF TEST PROBE EJECTION FOR DETERMINATION OF ORBIT OF OTHER SATELLITES.

Fig. 9

INVENTORS
CHARLES B. GROSCH
ROBERT L. LILLESTRAND

United States Patent Office 3,491,591
Patented Jan. 27, 1970

3,491,591
DYNAMIC SPACE NAVIGATION AND
SURVEYING SYSTEM
Charles B. Grosch, Minneapolis, and Robert L. Lillestrand, Edina, Minn., assignors to Control Data Corporation, Minneapolis, Minn., a corporation of Minnesota
Filed Apr. 3, 1967, Ser. No. 627,921
Int. Cl. G01c 21/00
U.S. Cl. 73—178                    14 Claims

ABSTRACT OF THE DISCLOSURE

The invention is concerned with a method involving the release of one or more test probes from an orbiting space vehicle which provides solutions to such diverse but related problems as satellite navigation, surveying from a satellite, and determining unknown orbital parameters of another space vehicle. The objectives are accomplished by repeatedly measuring the angular position, with respect to time, of a test probe ejected from the satellite in relation to known objects, such as stars. The measurements are utilized to solve the dynamic equations of motion to thereby obtain the position and velocity of the satellite or other space body.

Although a number of techniques have been devised by which an astronaut aboard a space vehicle may develop positional information as to the movement of the vehicle, prior art systems have shared a common disadvantage, that being the necessity of utilizing complex equipment in obtaining data necessary for the computation involved in generating the desired information. The present invention is novel in that it is a method which not only permits positional information to be obtained as to the space vehicle, but also is capable of use in fixing the location of objects other than the vehicle. The new method is implemented utilizing a minimum of simple, inexpensive, easy to operate apparatus.

One object of the invention is to provide a dynamic space navigation, surveying, and tracking system which can be conveniently contained in a space vehicle and which provides accurate results, without being dependent upon the observation of solar system bodies which have unrecognizable surface features or which may be concealed by atmosphere, clouds, or the like. Since no viewing of a planet or its horizon is required, it is possible to circumvent atmospheric problems which are conspicuously present in many self-contained systems.

Another object of the invention is to provide a system which is entirely autonomous and does not require data transmitted from the ground for its implementation. Thus, if communications equipment were to fail, the astronaut could determine his position and velocity by means of onboard measurements only.

Another object of the invention is to provide a technique which will provide the means for achieving a quick navigational fix. In some cases, this can be accomplished in as little as $\frac{1}{16}$ of an orbit. Because of this, the technique has considerable potential for emergency situations arising with a manned satellite.

Still another object of the invention is to provide a means for achieving a navigational fix without depending upon the viewability of certain ground stations or the occulting of certain stars. In contrast, the present method can be initiated at any time the astronaut desires by the mere act of releasing a small test probe.

Another object of this invention is to provide a means for determining navigational position determinations wherein the conditions restricting probe ejection are not critical. Error propagation studies show that the ejection speed may almost be any value, provided the probe can be detected and the usual precautions are taken to avoid parallax errors. The direction of probe ejection is also not critical, provided the release direction is at least five degrees from the normal to the orbit plane.

Further objects and the entire scope of the invention will become more fully apparent when considered in light of the following detailed description of illustrative embodiments of the invention and from the appended claims.

The illustrative embodiments may be best understood by reference to the accompanying drawings, wherein.

Briefly, the invention involves the release from a space vehicle of a small object, or test probe, and then observing the angular position of this probe relative to known objects, such as stars, at various times during the orbit of the vehicle. The angular position and time measurements are utilized by a computer to solve navigational equations to determine the position and velocity of the vehicle at the time the test probe was released. Having this information, past and future positions of the orbiting vehicle can be determined, and the position of other objects can also be determined.

The detailed description of the invention which now follows is specifically directed to the motion of a space vehicle in orbit about a planet, or other space body, as contrasted with interplanetary trajectories. However, it should be appreciated that if the space vehicle is moving in a transfer orbit from one space body to another, the present method may be utilized.

The motion of a space vehicle in orbit is governed by a sixth order system of differential equations. Thus, in order to define a particular orbit, it is necessary to determine six unknowns. Once the orbit becomes so defined, it is possible to solve problems involving the motion of the vehicle itself, or to fix the positions of other objects. Typical equations of orbital movement are presented in a paper entitled "Autonomous Navigation Based on Ejection of Artificial Test Probe" prepared for the XVII International Astronautical Congress, Madrid, Spain, 9–15, October, 1966. This reference is authored by the inventors, and gives the analytical foundation for the invention.

The present invention utilizes a concept whereby a test probe is propelled from a space vehicle to thereby assume a different path which can also be mathematically expressed. At times subsequent to the release of the test probe, the probe is observed from the vehicle. The angular positions of the probe with respect to known points, or identifiable bodies in space, are measured from the vehicle, and the times of measurement are recorded. The data so obtained is supplied to a computer which is programmed to solve the complex differential equations necessary to produce the desired information.

This method is valid because of the fact that there is a relationship which exists between the path of the test probe and that of the space vehicle. More particularly, at the instant that the probe is released from the vehicle, they are both at the same position. By later relating the direction to the test probe as seen from the space vehicle in angular and time relationship with respect to known points or bodies, such as the start, the precise orbits of the test probe and space vehicle can be determined.

As stated previously, the present invention is adaptable to both space navigation and surveying. However, in order to perform the latter function, the orbit of the space vehicle must be known. Therefore, in considering the further details of the invention, the navigation aspect will be treated first.

To determine the six unknowns of the orbital equation, at least six measurements of the released test probe must be taken. To restrict the operation to this minimum number of measurements, some information concerning the ejection conditions of the test probe is necessary. More particularly, the direction of the probe as it is propelled from the space body, as well as its release speed, must be known. This can easily be achieved by providing an ejection device which can be aimed in a determinable direction, for example at an identifiable star, and which will discharge the probe at a prescribed or measurable speed. When such apparatus is available, the time when the probe is released is measured and its speed and direction at that time recorded. Thereafter, six separate measurements of the angles between the test probe and two or more known identifiable objects must be taken and the times of measurement recorded.

Since this method is dynamic, the differential effects of the gravitational field of the space body being orbited on the relative motion of the test probe and the space vehicle form the basis for the navigational fix. For this reason, a sufficiently long time interval over which the measurements are taken must be allowed so that the gravitational forces produce a sufficiently large position displacement. Typically, a minimum of about 1/10th of an orbit must be allowed for even a crude navigational fix to be established. For a definitive orbit, measurements should be taken over a time interval of at least one-half to one orbital period.

To optimize the viewability of the test probe from the space body, the probe should be above the horizon of the body being orbited as much of the time as possible.

Figure 1:
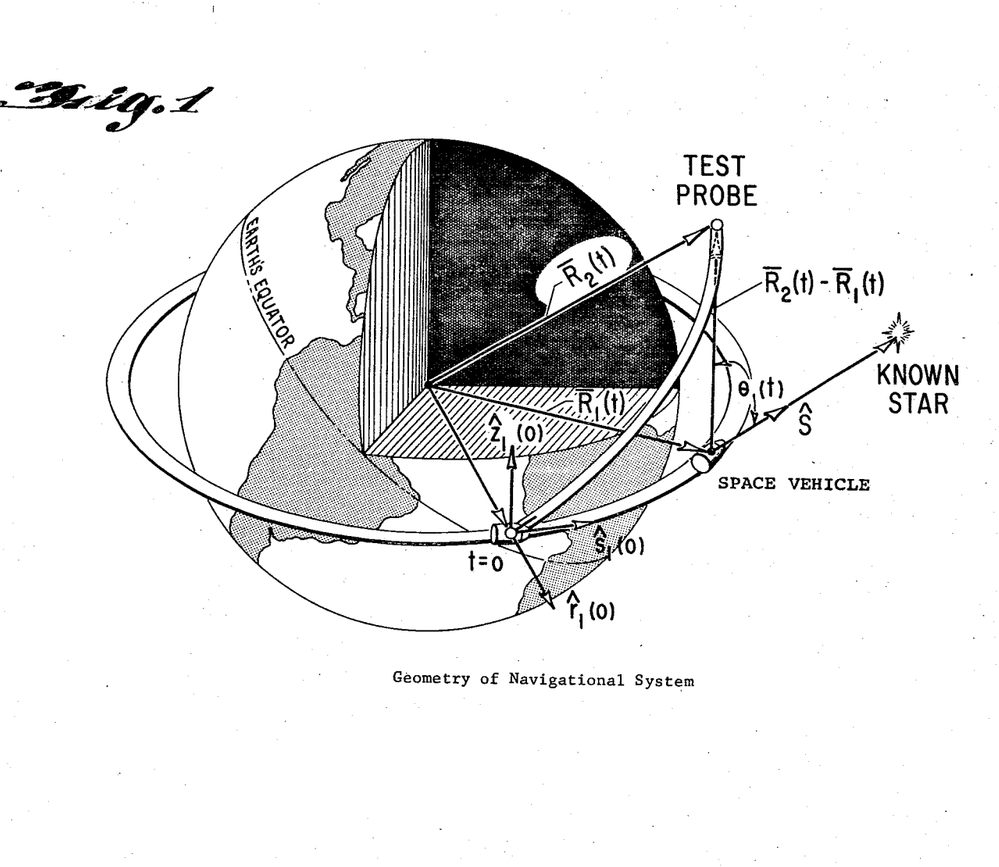
FIGURE 1 is a diagrammatic representation of the spacecraft's path, the probe's path, and a measured angle.

In FIGURE 1 of the drawings there is diagrammatically illustrated the paths of a space vehicle, and a test probe which has been released therefrom, both of which are orbiting about a space body such as Earth.

The following notations apply to FIGURE 1:

$\hat{r}$=unit vector in the direction from the center of planet about which the space vehicle is orbiting, to the space vehicle.

$\hat{s}$=unit vector perpendicular to $\hat{r}$ and in the plane of the motion such that the space vehicle's velocity has a positive component on $s$.

$\hat{z}=\hat{r}\times\hat{s}$ $\overline{R}_1$=position vector of space vehicle with origin at planet's center.

$\overline{R}_2$=position vector of probe with origin at planet's center.

$\theta$=angular separation measured between the test probe and a known star.

$t$=time.

The foregoing description has been directed to the release of a single test probe and making angular and time measurements with respect to this single probe in order to obtain the data necessary to compute the unknowns. However, it should be appreciated that a plurality of test probes can be utilized. For example, three test probes can be simultaneously released at specific speeds, all probes being propelled in known directions, as by pointing them at three known stars. In such a situation, subsequent to release, angular and time measurements for each test probe are made. When at least six measurements are obtained, the unknowns can be calculated.

The foregoing arrangements assume that the direction and speed of the test probe are known. However, if knowledge of these parameters does not exist, the invention can still be implemented. For example, if only the direction of release of the test probe is known, as would be the case if the probe were pointed at a known star but released at some unknown speed, a solution for the position of the space vehicle can be obtained by making at least seven observations of angular separation between the test probe and known objects and recording the times of these measurements. If the speed of the test probe is known but not its direction, a minimum of eight such measurements is required. If neither the speed nor the direction of the test probe is known, a minimum of nine angular measurements is essential to obtain sufficient information to determine the unknowns with respect to the orbit of the space vehicle.

Of course, the more knowns there are available, the greater the accuracy of the system. Accuracy of the system is also a function of the time interval over which the angular separations of the test probe from the known objects are made, with the accuracy generally improving as this time interval is increased.

The accuracy of this invention has been estimated under various conditions by simulating the behavior of the various navigational parameters on a general purpose digital computer. The following notations are introduced to aid in the understanding of the discussion which follows:

$\Delta \overline{v}$=ejection velocity of probe (a vector quantity).

$\Delta v$=ejection speed of probe (a scalar quantity).

$\epsilon$=complement of the angle between $\overline{R}_2-\overline{R}_1$ and $\hat{z}$.

$\alpha$=angle between $r$ and the projection of $R_2-R_1$ on the $(\hat{r}-\hat{s})$ plane.

$\epsilon_0, \alpha_0=\epsilon$ and $\alpha$ at the instant of ejections.

$t_j$=times of the sighting of the probe, where $j=1, 2, \ldots n$ $\tau_n=t_n/T$, where $T$=orbital period, $t_n$=time of the $n$th sighting.

$\delta R_1$=error in $\overline{R}_1$ produced by measurement error.

$r, s, z$—defined by $\delta R_1 = r\hat{r} + s\hat{s} + z\hat{z}$ $\Sigma$=average of $\sqrt{\sigma^2(r)+\sigma^2(s)+\sigma^2(z)}$ for $t_n \leq t \leq +T$ The computer simulation was made with the following assumptions:

(1) The only force acting on the probe and the space vehicle is an inverse square-central force field.

(2) Instead of assuming the quantity to be measured is the angle between a known star and the probe as described earlier, the declination and right ascension of the probe are assumed to be measured at each sighting. It is not operationally possible to directly measure these angles, but the angles measured by a sextant are essentially equivalent.

(3) Sightings are equally spaced in time. Two measurements are taken at each sighting.

(4) The probe is a point target.

(5) A random error is present in each angle measured. The error distributions of each angle measurement are independent. There is no systematic measurement error. The error in each calculated parameter is a linear combination of the measurement errors.

(6) The standard deviation of the measured angles is given by $\sigma(\delta e) = \sigma(\delta a) \cos e = 10$ arc seconds, where $\delta e$ = error in declination of probe and $\delta a$ = error in right ascension of probe.

(7) The space vehicle orbit was chosen to be nearly circular, with an inclination of 28 degrees, and approximately 200 kilometers in altitude.

Figure 3:
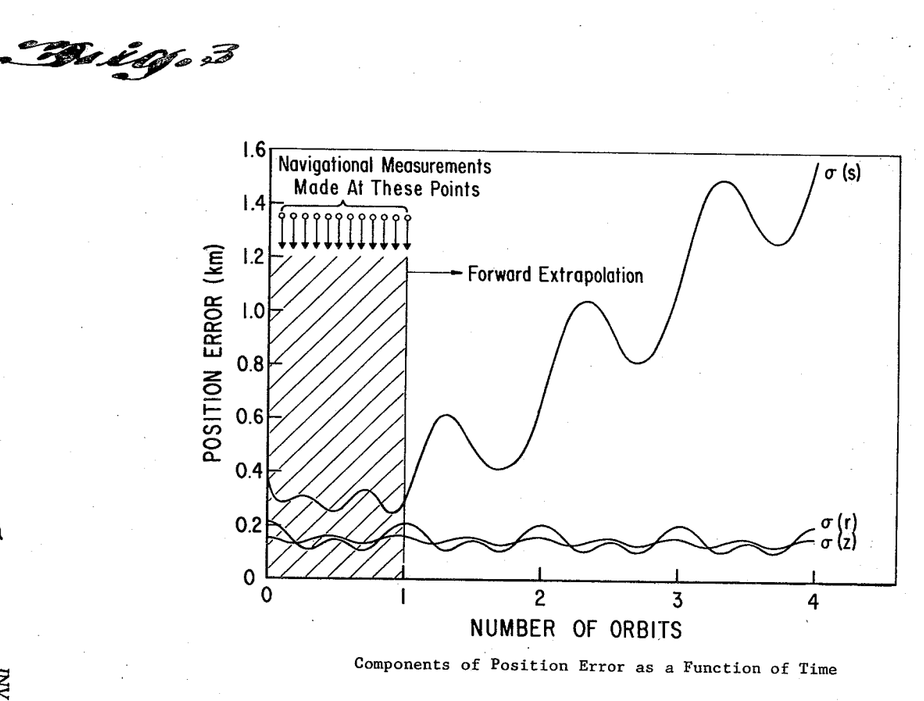
FIGURE 3 is a graph illustrating position error in the three coordinate directions as a function of the number of spacecraft orbits.

FIGURE 3 gives the standard deviation of the three components of position error as a function of time for the case in which twelve sightings are made over a duration of one orbital period. The ejection velocity is assumed known, and is characterized by $\Delta v = 10$ meters per second, $\epsilon_0 = 35.26°$, $\alpha_0 = 45°$.

Figure 4:
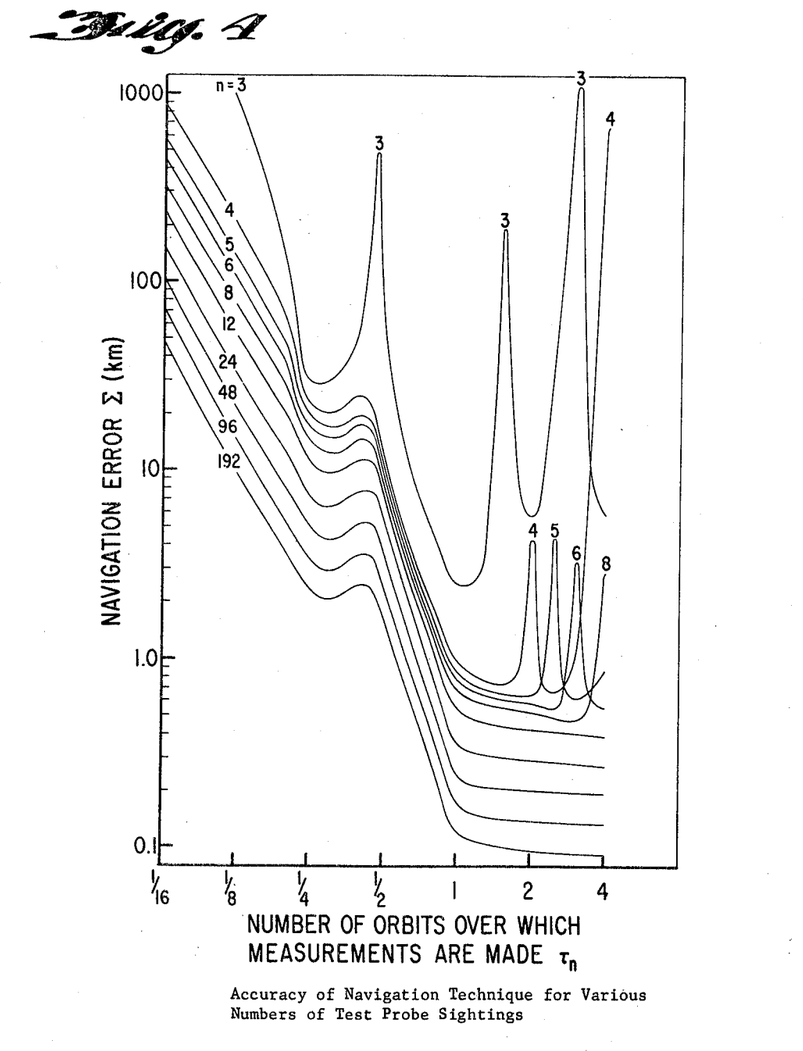
FIGURE 4 is a graph illustrating the navigational error as a function of the number of orbits over which measurements are made.

The manner in which the accuracy of the position varies as a function of the total number of sightings and the time interval over which these sightings are made for the same ejection direction and speed is shown in FIGURE 4. For FIGURE 4, it was also assumed that no errors were made in ejection.

Figure 5:
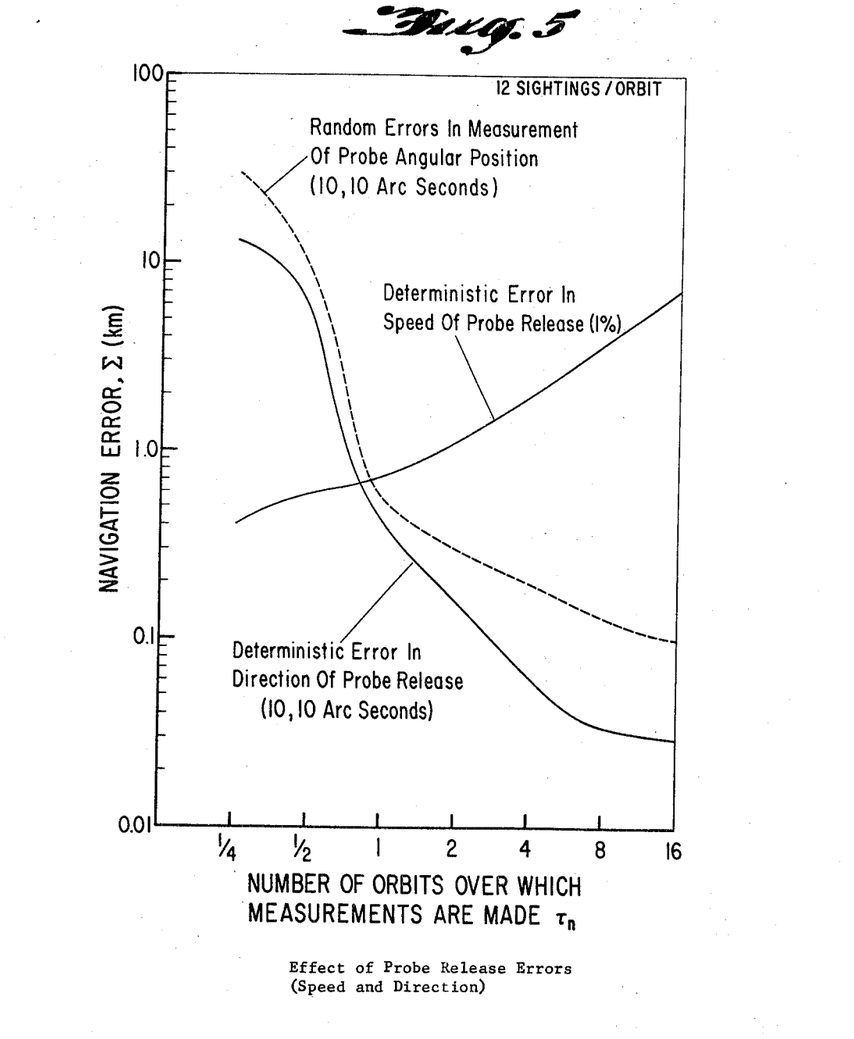
FIGURE 5 is a graph illustrating the navigational error as a function of the number of orbits over which measurements are made, with the number of sightings per orbit held constant.

In FIGURE 5, the effects of errors in ejection velocity are given. One curve shows the effect of a one percent speed error, and another shows the effect of ten seconds of arc in each component of direction. For purposes of comparison, the effect of errors in direction measurements is also plotted. Note that as $\tau_n$ increases, the effect of a speed error increases, but the effect of an error in ejection direction decreases.

Figure 6:
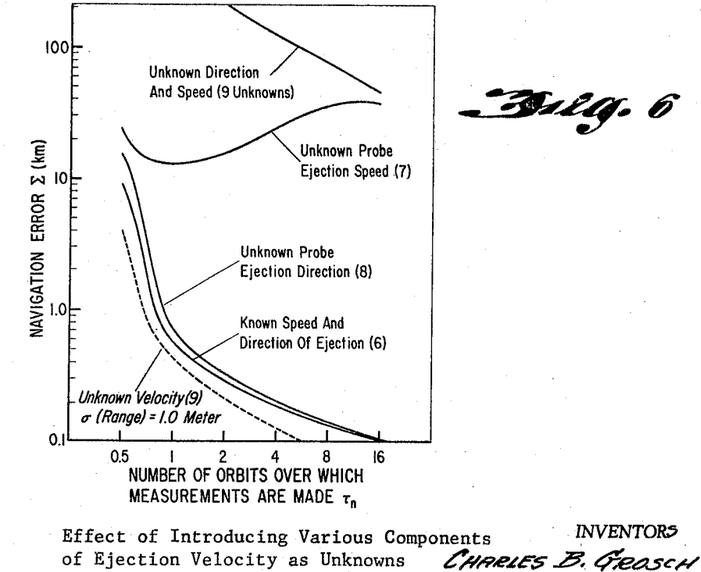
FIGURE 6 is a graph illustrating the navigational error as a function of the number of orbits over which measurements are made for various probe ejection unknowns.

In FIGURE 6, the effect of introducing unknowns as to the ejection velocity is shown. This figure yields the effect of unknown velocity, unknown ejection speed, and unknown ejection direction on the accuracy of the position determination. Again, the ejection is characterized by $\Delta v = 10$ meters per second, $\epsilon_0 = 35.26°$, and $\alpha_0 = 45°$. FIGURE 6 shows that the case in which the ejection speed is unknown should be avoided if only angle measurements are made. Thus, the ejection mechanism should be capable of ejection with a known speed. In contrast, if the ejection direction is unknown and the ejection speed known, then the accuracy is nearly as good as in the case in which the ejection velocity is known. It is also shown in FIGURE 6 that if the distance between the probe and satellite were measured, then an unknown ejection velocity could be allowed.

Figure 7:
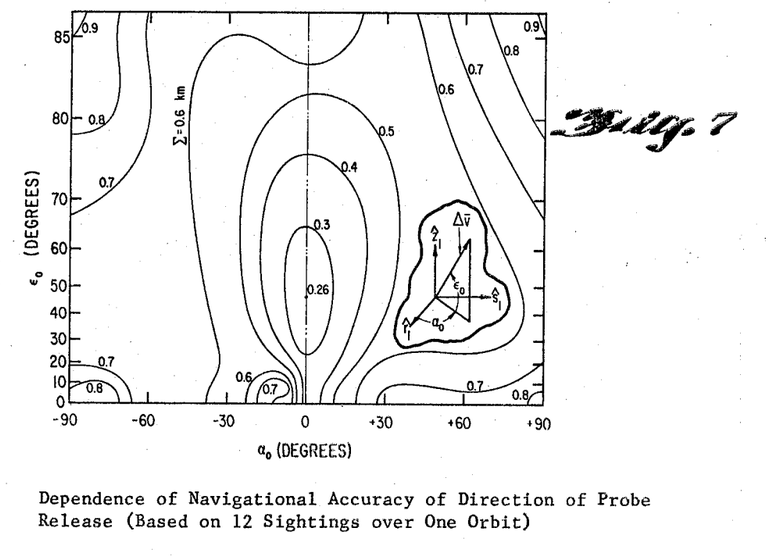
FIGURE 7 is a graph illustrating the dependence of navigational accuracy on the direction of probe release.

It has been discovered that navigational accuracy varies with the direction of probe ejection. FIGURE 7 shows this variation for the case in which 12 sightings are made over one orbital period. This figure shows that ejection in the $\hat{r}-\hat{z}$ plane generally provides greater accuracy than ejection in other directions. However, ejection near the $\hat{z}$-axis shown should be avoided.

Figure 8A:
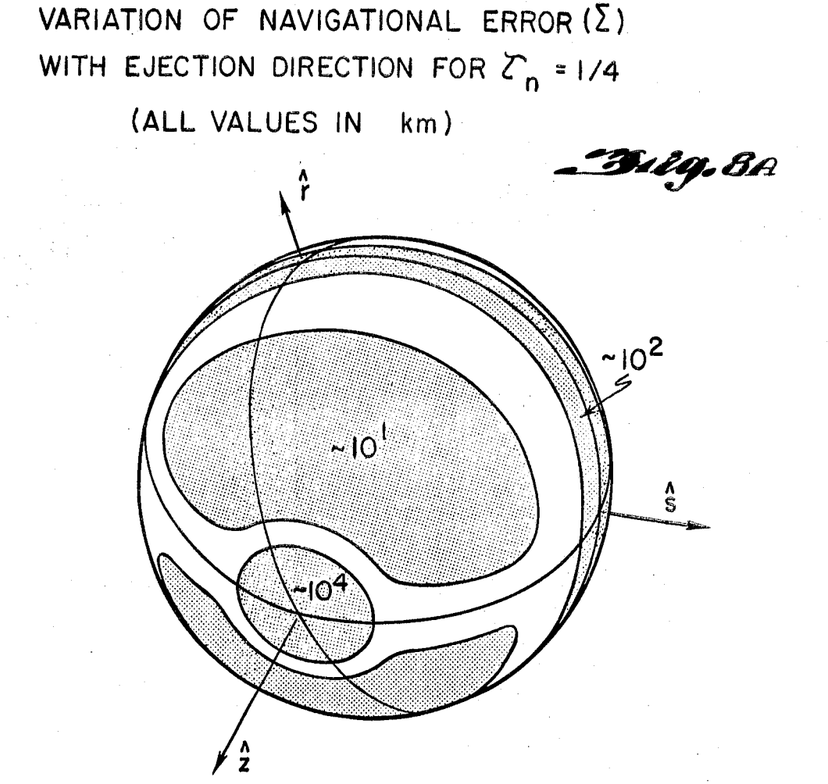
FIGURE 8 is a chart illustrating the approximate variation of navigational error with ejection direction.
Figure 8B:
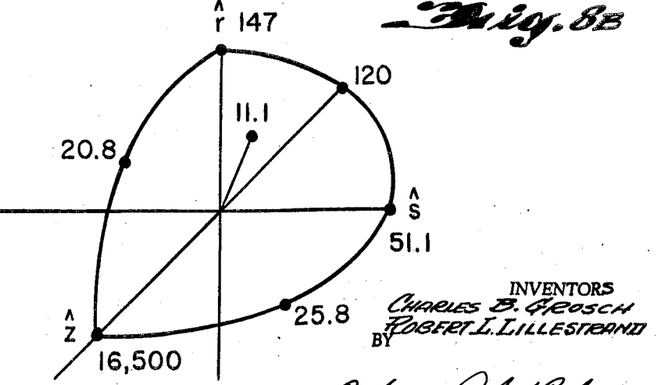

When the period of time is reduced over which the measurement of test probe position relative to the stars is made, navigational errors increase as was described previously. Further, the direction of test probe ejection becomes more critical and this is shown in FIGURE 8A. The sphere on the upper half of this figure shows three general regions from the point of view of navigation errors. Near the $\hat{z}$ axis the errors are large—of the order of $10^4$ kilometers; near the orbit plane ($\hat{r}-\hat{s}$ plane) the errors are intermediate in size, being of the order of $10^2$ kilometers; in the remaining region the errors are small, being of the order of $10^1$ kilometers. Numerical values for ejection in certain specific directions are shown in FIGURE 8B, in which case the smallest errors were obtained for ejection in an oblique direction which is approximately equiangular from each of the $\hat{r}, \hat{s},$ and $\hat{z}$ axes.

In certain emergency situations it was felt that it might prove advantageous to be able to achieve a navigational fix using measurements collected over a period as small as $\frac{1}{16}$ of an orbit. When this was done for ejection equiangular from the $\hat{r}, \hat{s},$ and $\hat{z}$ axes, the following results were obtained:

$\sigma(r) \approx 100$ kilometers
$\sigma(s) \approx 100$ kilometers
$\sigma(z) \approx 1$ kilometer This again shows that even under extreme conditions the method is remarkably accurate in the determination of the orientation of the orbit plane.

In carrying out the foregoing invention, a minimum of equipment is required. For example, the test probe is preferably an element having a diameter ranging from ½" to 5". The test probe may be self-luminant, or it may be viewed by means of reflected solar radiation. Its mass must be sufficient so that tthe normal environmental disturbances which tend to deflect the probe from its ideal path are small.

It has been previously stated that it is desirable for the test probe to be released in a given direction at a known speed. A number of arrangements may be utilized in this regard. For example, a gun-like structure equipped with appropriate sights can be employed to properly direct the test probe. The speed of the probe could be measured by timing its motion as it proceeds down the barrel of the gun-like structure, or by specifically designing the propelling element of the structure, such as a spring, to discharge the ball at a prescribed speed. Such a speed would preferably be in the range of one to a hundred feet per second.

It is important that the test probe be visible after it leaves the space vehicle. By using the spiral flutings in the discharge barrel, a slow spin could be imparted to the test probe which would create a blinking effect easily detectable by the observer when viewed with a background of stars.

Of course, a suitable clock is necessary to time the discharge of the test probe from the space vehicle and to record the times when angular measurements are made with respect to the test probe.

A conventional sextant or optical scanning device could be utilized to make the angular measurements between the test probe and the known point, or a star.

Although specific apparatus is disclosed for propelling the test probe, it will be appreciated that the probe can be manually hurled from the space vehicle by the astronaut. Of course, in such a case the direction and speed of the test probe are not known and therefore additional measurements would be required, as outlined above, to obtain sufficient data to calculate the unknowns of the space vehicle orbit.

It has already been stated that once the unknowns of the orbit of the space vehicle have been determined, the present system is capable of use in surveying from space. This system has a certain basic operational advantage compared with some of the more direct methods of determining the location of a surface target. This results from the fact that the inertial rate at which the sight line to the ground target is moving is perhaps ten times greater than the inertial rate at which the sight line to the test probe is moving at the time the measurements are made. Thus, as the ground target rapidly moves by, the astronaut need only point at it—somewhat like shooting at a duck, but with no lead required. The actual angular measurement is not performed until later, at which time the astronaut measures the position of the test probe relative to the stars with a sextant-like instrument. He picks a time for the measurement of the probe position when the sight line has a very low inertial rate.

Two cases are encountered when determining the position of a particular object from a space vehicle. The first is that the altitude of the object is known, but its latitude and longitude are unknown, and the second case is where latitude, longitude and altitude are all unknown. The first case might be a ship at sea. Obviously, its altitude is known but its latitude and longitude are not. The second case could be, for example, another satellite in space.

The procedure for fixing an object having known altitude, but unknown latitude and longitude, is by propelling a test probe from the space vehicle at the particular object to be positionally fixed. The time of release of the test probe is recorded. At a later time, when the test probe is above the horizon of the body being orbited, two angular measurements between the test probe and known objects, such as stars, are taken and the times of the measurements recorded. Utilizing this information, the latitude and longitude of the object being fixed can be computed.

In the case where neither latitude, longitude nor altitude is known, two test probes are propelled toward the object in question, the separate times of probe release being recorded. When the two probes are above the horizon, angular measurements between each of the probes and two stars are made, and the times of these four measurements are recorded. The three position unknowns of the object being fixed can then be calculated.

Figure 2:
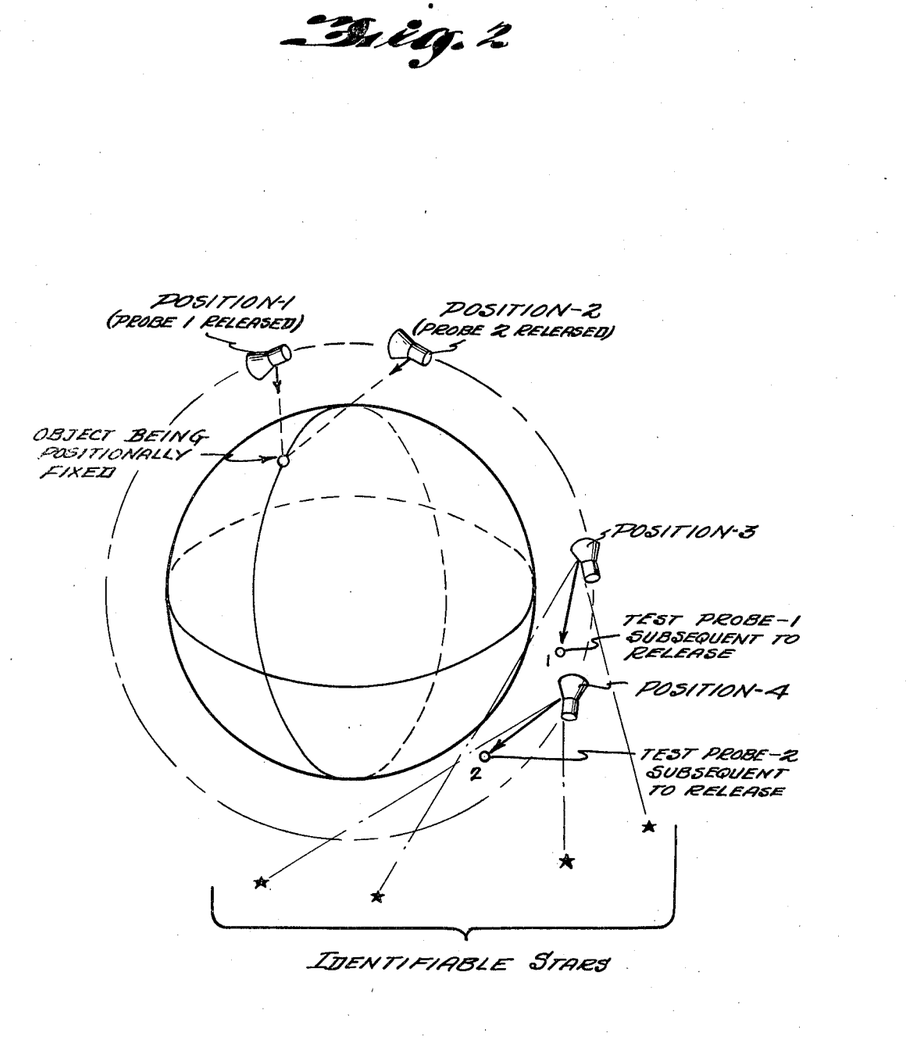
FIGURE 2 is a diagrammatic representation of a scheme for releasing test probes and obtaining measurements with respect to the probes when performing space surveying according to the invention.

The foregoing procedure can be more clearly appreciated by reference to FIGURE 2 which illustrates the two positions of the space vehicle at which the first and second test probes are respectively released and the subsequent positions of the vehicle when the test probes are angularly measured with respect to known stars. To assure reasonable accuracy, the space vehicle should move ¼ to ½ an orbit from the releasing positions before the angular measurements are taken.

Of course, other combinations of test probe releasing may be employed. For example, if the orbit of the space vehicle were unknown, it is possible to make additional measurements on either or both of the test probes (which were ejected in the direction of the object) as a means of computing the spacecraft orbit as a first step. Next, one could compute the position of the object.

To summarize the invention described hereinbefore, it allows calculations to be made to solve for:

(a) the space vehicle's orbit unknowns (navigation),
(b) the orbital unknowns of another space vehicle (tracking), and
(c) the location of a ground station (surveying).

Various combinations of the above-listed types of unknowns may also be solved. For example, the space vehicle's orbit and the location of a ground station can be solved by ejecting two test probes in the direction of the ground station at different times. All of the practical combinations are summarized in Table A below:

TABLE A

| Case No. | Navigation (6 unknowns) | Surveying (3 unknowns) | Tracking (6 unknowns) |
| --- | --- | --- | --- |
| 1 |   | X |   |
| 2 |   |   | X |
| 3 |   |   | X |
| 4 | X | X |   |
| 5 | X |   | X |

Whenever space surveying is being performed in accordance with the present invention, the direction of release should be planned so that the test probe moves above the horizon as quickly as possible. This can be achieved by pointing ahead at ground targets at the time of test probe release. A backward release will carry the test probe to a lower altitude orbit which makes viewing more difficult.

By way of illustration as to how the test probe technique can be fully utilized, the following example will be described. Assume that the orbit of a comand satellite is not known through some series of malfunctions, nor is the position of an excursion device under control of the command satellite. If a first navigational test probe is released, it can be used to obtain sufficient measurements by which the orbital parameters of the command satellite can be determined. By then sequentially propelling three or more test probes at the excursion vehicle and thereafter waiting approximately one-fourth an orbit parameters of the excursion vehicle can be ascertained. Armed with this information, such complicated maneuvers as the rendezvous of the command satellite with the excursion vehicle can be achieved since the positions of the two are known and future positions can be predicted.

Figure 9:
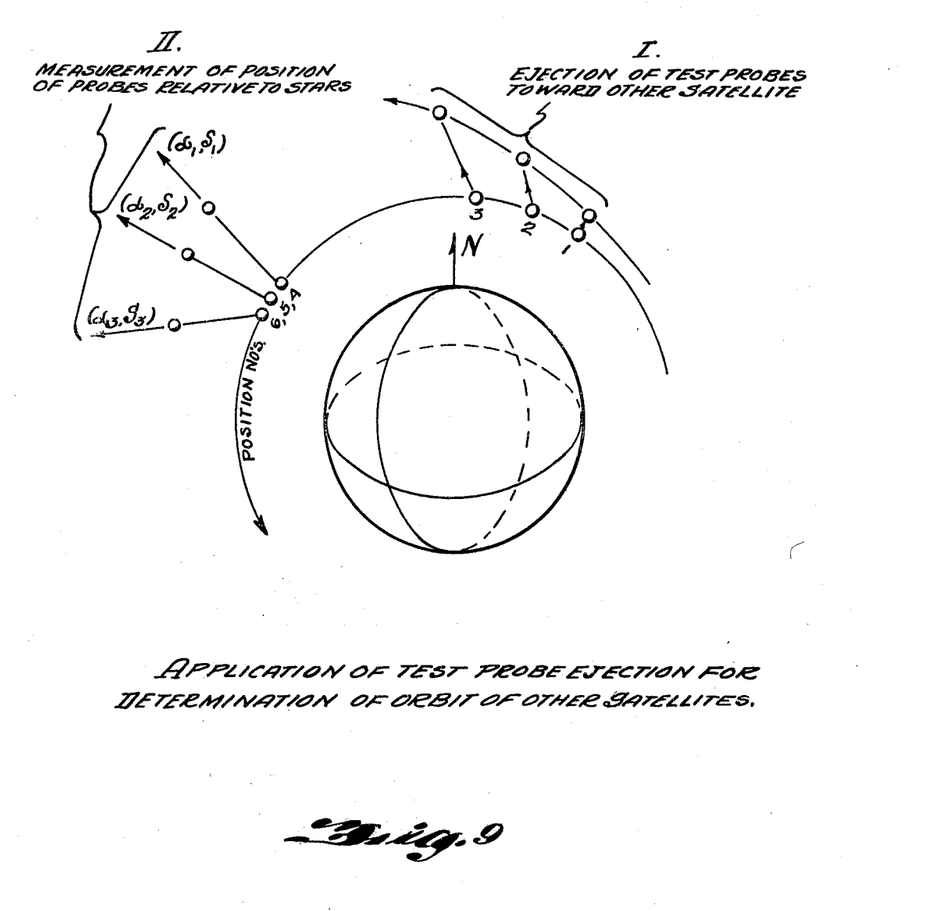
FIGURE 9 illustrates an application wherein a plurality of test probes are ejected to determine the orbit of a second space vehicle or satellite.

FIGURE 9 illustrates how the ejection of three test probes can be utilized in this type of an application. In this case, since there are three probes and each may be characterized by two position components such as right ascension and declination, a total of six measurements will provide enough information to allow the six orbital unknowns of the excursion satellite to be computed. It is apparent that this same method would yield enough information to also compute the orbital unknowns of the command space vehicle, if such were necessary, by making a total of twelve measurements of the probes relative to known stars.

From the foregoing description, it is apparent that the principal advantage of the test probe technique is that it can be performed manually with very simple equipment. There is no requirement that the space vehicle have precision attitude control nor is there any necessity for such complicated devices as inertial platforms or automatic celestial sensors for directional references. Furthermore, no measurements to or from the planetary body about which the space vehicle orbits are required. In the case of Earth orbits, this fact is of some importance since it permits the circumvention of atmospheric problems which hinder the effectiveness of other systems. This feature is even more important in determining orbits about other planets, such as Venus, where observation of the detailed surface features of the planet are virtually impossible.

Although error propagation studies have shown that the best accuracy can be obtained if the speed of the ejection of the test probe is known, two other types of measurements can be used which will also assure the realization of substantial accuracy. These are to measure the range of the test probe from the space vehicle, and to measure the radial speed of the test probe from the space vehicle. The first of these measurements can be made by using radar and the second by using Doppler devices.

Although the present invention has particularly been directed to space navigation, surveying, and tracking, it should also be appreciated that the invention could also be adapted to use in solving the perturbing forces problem which exists in space. Such forces may arise from radiation pressure, atmospheric drag, magnetic field effects, etc.

The above-described embodiments are illustrative of preferred arrangements for utilizing the inventive concept but are not intended to limit the possibilities of insuring accurate space navigation, tracking, and surveying. As an example, the angular measurements of the test probes need not be restricted to a relationship with identifiable stars or other space bodies. One or more known ground targets on the body being orbited can also serve as the reference for the angular measurements. The system disclosed herein are examples in which the inventive features of this disclosure may be utilized, and it will become apparent to one skilled in the art that certain modifications may be made within the spirit of the invention.

What is claimed is:

1. A method of determining the relative positions of a first object in space orbiting about a second object in space, comprising the steps of:
   (a) releasing at least one test probe from said first object and recording the time of each said release;
   (b) measuring, from said first object, at least nine angular relationships between the released test probes and at least two further objects in space which are identifiable and whose positions are known;
   (c) recording the times at which each said angular relationship is made; and
   (d) utilizing the recorded, measured, and known information to solve dynamic equations of motion to determine the desired positional information.

2. A method of determining the relative positions of a first object in space orbiting about a second object in space, comprising the steps of:
   (a) releasing at known speed at least one test probe from said first object and recording the time of each said release;
   (b) measuring, from said first object, at least eight angular relationships between the released test probes and at least two further objects in space which are identifiable and whose positions are known;
   (c) recording the times at which each said angular relationship is made; and
   (d) utilizing the recorded, measured, and known information to solve dynamic equations of motion to determine the desired positional information.

3. A method of determining the relative positions of a first object in space orbiting about a second object in space, comprising the steps of:
   (a) releasing in known direction at least one test probe from said first object and recording the time of each said release;
   (b) measuring, from said first object, at least seven angular relationships between the released test probes and at least two further objects in space which are identifiable and whose positions are known;
   (c) recording the times at which each said angular relationship is made; and
   (d) utilizing the recorded, measured, and known information to solve dynamic equations of motion to determine the desired positional information.

4. A method of determining the relative positions of a first object in space orbiting about a second object in space, comprising the steps of:
   (a) releasing at known speed and in known direction at least one test probe from said first object and recording the time of each said release;
   (b) measuring, from said first object, at least six angular relationships between the released test probes and at least two further objects in space which are identifiable and whose positions are known;
   (c) recording the times at which each said angular relationship is made; and
   (d) utilizing the recorded, measured, and known information to solve dynamic equations of motion to determine the desired positional information.

5. A method of determining the relative positions of a first object in space orbiting about a second object in space, comprising the steps of:
   (a) releasing a plurality of test probes simultaneously in different directions from said first object and recording the time of said release;
   (b) measuring, from said first object, a plurality of angular relationships between the released test probes and at least two further objects in space which are identifiable and whose positions are known;
   (c) recording the times at which each said angular relationship is made; and
   (d) utilizing the recorded, measured, and known information to solve dynamic equations of motion to determine the desired positional information.

6. A method of determining the relative positions of a first object in space orbiting about a second object in space, comprising the steps of:
   (a) releasing a plurality of test probes successively from said first object and recording the times of said release;
   (b) measuring, from said first object, a plurality of angular relationships between the released test probes and at least two further objects in space which are identifiable and whose positions are known;
   (c) recording the times at which each said angular relationship is made; and
   (d) utilizing the recorded, measured, and known information to solve dynamic equations of motion to determine the desired positional information.

7. A method of determining the relative positions of a first object in space orbiting a solar system body in a known orbit and a second object in space orbiting about the same solar system body in an unknown orbit, comprising the steps of:
   (a) releasing at least three test probes from said first object directed toward said second object and recording the time of each said release;
   (b) measuring, from said first object, a plurality of angular relationships between the released test probes and at least two further objects in space which are identifiable and whose positions are known;
   (c) recording the times at which each said angular relationship is made; and
   (d) utilizing the recorded, measured, and known information to solve dynamic equations of motion to determine the desired positional information.

8. A method as claimed in claim 7 wherein the step of measuring includes at least two angular relationships between each test probe and at least two of the further objects in space which are identifiable, so as to obtain a total of at least six angular measurements.

9. A method as claimed in claim 8 wherein the solution of said equations includes a calculation of the orbital parameters of the second object in space.

10. A method of determining the relative positions of a first object in space orbiting a solar system body in a known orbit and a second object in space which is an identifiable object on the same solar system body, comprising the steps of:
    (a) releasing at least two test probes from said first object directed toward said second object;
    (b) measuring, from said first object, a plurality of angular relationships between the released test probes and at least two further objects in space which are identifiable and whose positions are known;
    (c) recording the times at which each said angular relationship is made; and
    (d) utilizing the recorded, measured, and known information to solve dynamic equations of motion to determine the desired positional information.

11. A method as claimed in claim 10 wherein the step of measuring includes at least two angular relationships between each test probe and at least two of the further objects in space which are identifiable, so as to obtain a total of at least four angular measurements.

12. A method as claimed in claim 11 wherein the solution of said equations includes a calculation of the location of the second object on the solar system body.

13. A method of determining the relative positions of a first object in space orbiting a solar system body in a known orbit and a second object in space which is an identifiable object on the same solar system body, comprising the steps of:
    (a) releasing at least one test probe from said first object at known speed and directed toward said second object;
(b) measuring, from said first object, a plurality of angular relationships between the released test probes and at least two further objects in space which are identifiable and whose positions are known;
(c) recording the times at which each said angular relationship is made; and
(d) utilizing the recorded, measured, and known information to solve dynamic equations of motion to determine the desired positional information.

14. A method as claimed in claim 13 wherein the solution of said equations includes a calculation of the latitude and longitude of said second object.

References Cited

UNITED STATES PATENTS

| | | | |
|---|---|---|---|
| 3,194,949 | 7/1965 | Jasperson | 73—178 XR |
| 3,229,521 | 1/1966 | Freeman | 73—178 |
| 3,290,933 | 12/1966 | Lillestrand et al. | 73—178 |

DONALD O. WOODIEL, Primary Examiner